Figure 1:
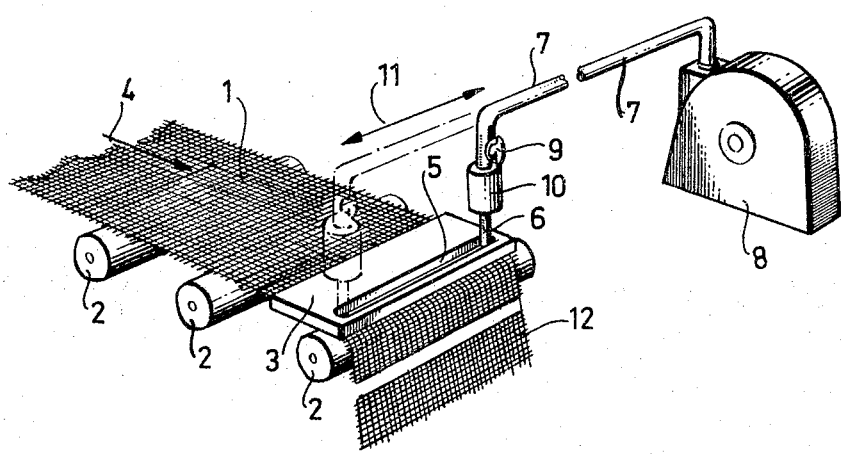

May 30, 1967     G. J. O. WELIN-BERGER     3,322,584

METHOD OF BONDING WEBS OF PLASTIC THREADS BY MEANS OF GAS JETS

Filed Sept. 30, 1963     2 Sheets-Sheet 1

INVENTOR.
GUY JOHN OLOF WELIN-BERGER
BY
Young + Thompson
Attys.

May 30, 1967  G. J. O. WELIN-BERGER  3,322,584
METHOD OF BONDING WEBS OF PLASTIC THREADS BY MEANS OF GAS JETS
Filed Sept. 30, 1963  2 Sheets-Sheet 2

INVENTOR.
GUY JOHN OLOF WELIN-BERGER
BY
Young + Thompson
ATTYS.

3,322,584
METHOD OF BONDING WEBS OF PLASTIC THREADS BY MEANS OF GAS JETS
Guy John Olof Welin-Berger, Box 228, Nacka, Sweden
Filed Sept. 30, 1963, Ser. No. 312,682
Claims priority, application Sweden, Oct. 3, 1962, 10,625/62
3 Claims. (Cl. 156—82)

In order to obtain a tight joint between a pair of plastic foils it is known to force together the plastic foils between grooved metallic backing plates which have been heated to a suitable temperature. Such so-called heat welding used for sealing plastic bags and similar packages suffers amongst other things from the inconvenience that the joint has to be comparatively wide to secure required strength and sealing effect. Further, in order to prevent damage to the plastic foil, the temperature of the backing plates has to be accurately adapted to a value exactly corresponding to the softening temperature of the plastic foil. Attempts to join fabrics or braids of plastic threads have met with great difficulties, especially in case of very fine threads which are likely to be destroyed upon heating so that a durable joint cannot be obtained. It has also proved impossible to obtain a joint between layers of plastic fabric by means of an open flame because the plastic threads are liable to be destroyed and because the temperature becomes too high. In packages where questions of flavour are of vital importance the parts of the fabric which as a result of the open flame are burnt and not free from smell also involve a considerable inconvenience. Discolouration which may occur in such heat treatment results in a less appealing appearance of the product.

The object of this invention is to avoid the above inconveniences by means of a method and a device which is especially well suited to obtain joints between fabrics or braids of plastic threads or to other treatment of such material, for instance to secure a durable edge of the material in consideration.

In its broadest aspect the method according to the invention is characterized by subjecting the area to be treated to the action of a jet of air or other gas of a temperature and speed such as to burn off the woven or braided plastic threads and to have fused plastic to join a thread to an adjacent one. Such a treatment may be applied to a single layer of fabric or braid, for instance for obtaining an edge at which the threads are locked to each other so that the edge cannot be ripped up. Proper heat treatment by means of the gas jet results in that the ends of the threads at the edge are burnt off whereby to obtain an even edge and further results in that the plastic material of the threads is simultaneously fused and formed into lumps which readily are welded to adjacent plastic threads and are firmly connected thereto. The method is also highly suited for interconnecting two layers of plastic threads. As a matter of fact the gas jet of suitable temperature and speed which strikes upon a pair of layers lying one upon the other is able under certain conditions to weld these layers to each other. However, if the plastic material consists of very fine threads it has proved impossible to prevent the threads from being burnt entirely and for this reason special measures have to be taken to ensure at the same time that the threads of the two layers are welded together.

In order to prevent the layers of plastic threads from being destroyed they may be covered, in the vicinity of the area to be treated by the air jet, with a protective mask, for instance with plates located on either side of the layer or layers, which plates leave the area to be treated exposed to the jet blown therethrough but protect the surrounding parts. In spit of this measure it is generally not possible to prevent the layer or layers from being cut off at the places through which the jet is blown, which is particularly the case if the fabrics or braids consist of very fine plastic threads. However, it is possible to adapt the jet or jets of hot gas or air such that the cutting is succeeded by welding together the ends of the threads at the places through which the jet or jets have been blown. In this way it is possible to obtain even and durable edges of a single layer and very narrow and fine joints between the edge of two layers lying one upon the other or side by side. As a rule the ends of the threads of one layer can be welded to the ends of the threads of another layer such that the joint actually consists of the united threads of the individual layers.

In view of the difficulty of preventing the material from being burnt at the places where the air jet strikes upon measures may be taken to ensure that the hot air strikes upon the plastic layer or layers at spots only. To this end the material may be covered by a plate having perforations confronting the areas to be heat treated. By way of example the plate may have a row of holes confronting the joint to be obtained. If two layers are to be joined they are suitably moved between two plates which both are provided with such holes whereupon the jet of hot air is directed toward the holes and moved along the row of holes. As a result thereof, corresponding holes will be made in the layers consisting of plastic threads and the edges of the holes will be surrounded by plastic threads welded together.

A suitable device for carrying the above method into effect is characterized by a nozzle for hot air and by a mask adapted to contact the plastic layer to be treated, but to leave one or more areas of the plastic layer exposed whereby to enable a jet of hot air from the nozzle to be blown through the plastic layer.

Additional features of the invention and advantages obtained thereby will appear from the following description of embodiments illustrated in the annexed drawing.

Figure 2:
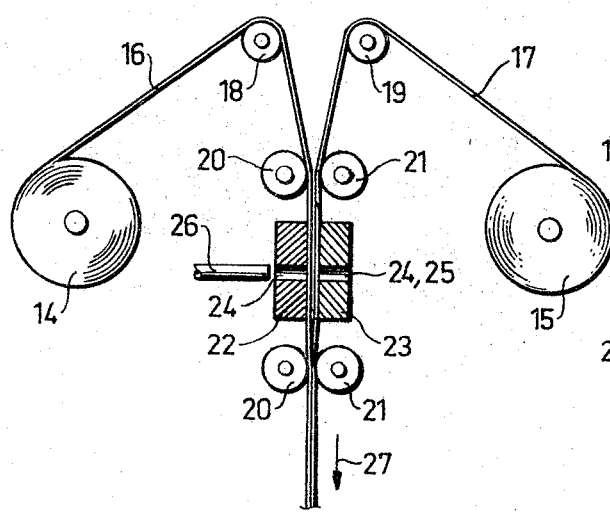
Figure 3:
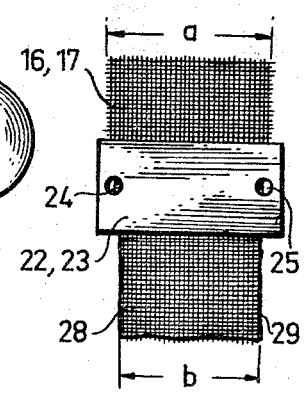
Figure 4:
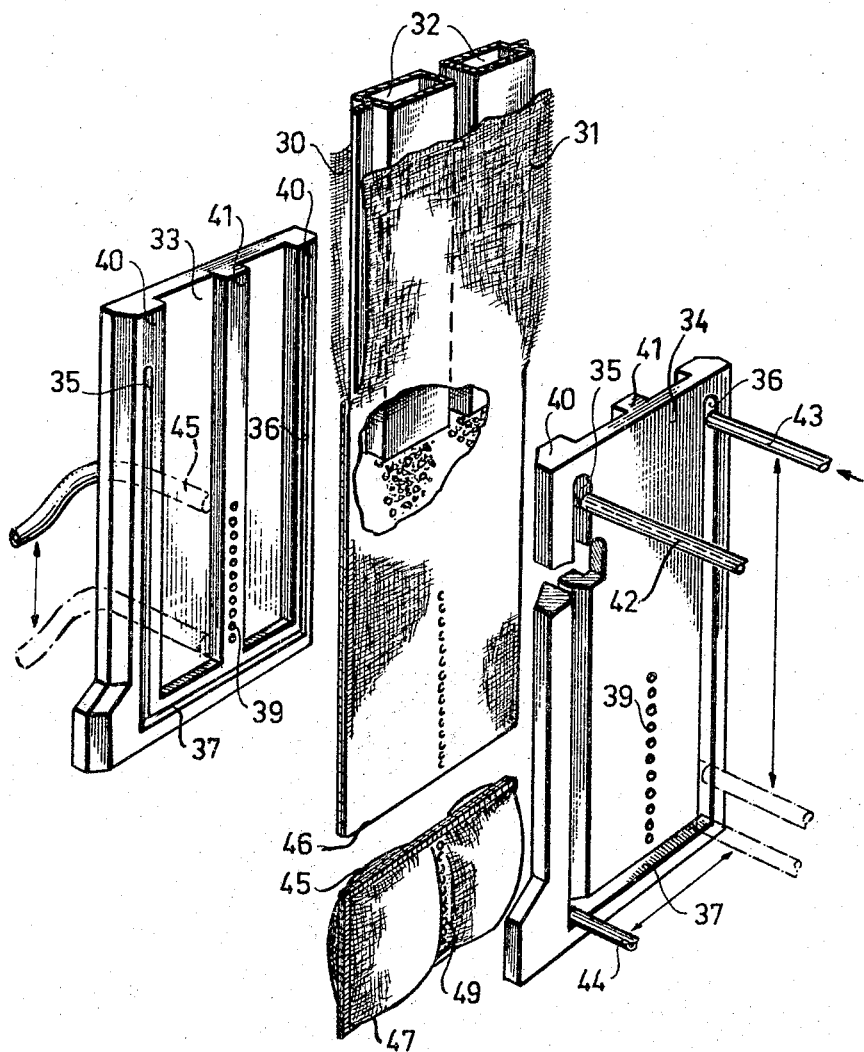

FIG. 1 is a perspective view of a simple device for cutting a web consisting of plastic threads, FIG. 2 illustrates a method of joining two webs of plastic fabric, FIG. 3 is a lateral view of a detail of FIG. 2, and FIG. 4 is a perspective and exploded view of a device for producing tea bags from webs of fabrics of plastic threads.

The method in consideration may be applied to fabrics or braids of plastic threads of different kinds of material and different gauges. For example it has proved possible to treat nylon fabrics of threads of a thickness as small as 20 to 30 deniers and with the threads lying as close as three threads per millimetre. The air jet may be generated by a compressor having a delivery pressure of 85 to 100 lbs./sq. in. The air passes through a valve to a heating element which heats the air to a temperature above 464° F. for instance 572 to 752° F. If electric heating elements are used their power may be about 300 watts. The speed of the air leaving the nozzle which generates the air jet is of a certain importance and has to be well adjusted.

Referring to FIG. 1, reference numeral 1 denotes a web of fabric of plastic threads which is advanced on a plurality of rollers 2 below a protective mask in the form of a plate 3. The web is intermittently advanced so as to be alternatively at a rest and moved along in the direction indicated by the arrow 4. The device is intended to cut off pieces of predetermined lengths from the web 1. To this end, the plate 3 has a slot 5 extending transversely of the web and above the slot there is provided a nozzle 6 which is directed at right angles to the web. The nozzle is connected to a compressor 8 by means of a duct 7 having a valve 9 ahead of a heating element 10. Air is flown from the compressor 8 through the duct 7 and valve 9 to the heating element 10 by means of which it is heated to a suitable temperature. From the heating element the air passes through the nozzle 6 and leaves the nozzle in the form of a jet which passes through the slot 5. If the nozzle is moved longitudinally of the slot as indicated by a double arrow 11 the jet of air will be blown through a fabric, and the threads forming the fabric will be fused with the result that a piece 12 of the fabric will be cut off. Durable edges will be formed at the places where the air jets have passed through the fabric because the threads will be welded together at those places as they are burnt off.

FIG. 2 shows by way of example how two webs can be joined along their longitudinal edges. Two webs 16 and 17 are unwound from supply spools 14 and 15 respectively and are passed round deflecting rollers 18 and 19 and beyond guide rollers 20 and 21 down between a pair of protective masks in the form of plates 22 and 23 having confronting holes 24 and 25 at the longitudinal edges of the webs. Each hole 24, 25 is confronted by a nozzle 26 which directs a jet of hot air through the holes 24, 25 and through the webs 16, 17 at the places exposed by the holes 24, 25. According as the webs are advanced in the direction indicated by the arrow 27 the outermost longitudinal edge portions of the webs are burnt off and the edge threads of the webs are welded together so that the treated material after having passed the plates 22, 23 will have longitudinally joined edges 28, 29. It is to be noted that the width of the webs which prior to the treatment is indicated at *a* in view of the burnt-off edge portions after the treatment has been reduced to *b*.

FIG. 4 illustrates an example of manufacturing bags of fabrics of plastic threads, for instance for packing tea to be used for brewing a beverage. Here, numerals 30 and 31 denote two webs of plastic threads located on either side of a pair of filler tubes 32 through which the material for instance tea, with which the bags are to be filled is fed down between the webs. The webs are kept in contact with each other between protective masks in the form of plates which in reality have to force the webs against each other, but for the sake of clearness are separated from the webs in the drawing. Near their longitudinal edges both plates 33, 34 have slots 35, 36 extending parallel to and slightly within the longitudinal edges of the webs. Further each plate has a transverse slot 37 near its lower end. The slots 35, 36 and 37 in one plate are confronting corresponding slots in the other plate. The plates also have substantially central perforations in the form of rows 39 of holes extending parallel to the longitudinal slots 35, 36. The slots and holes are provided in projecting edges 40 and 41, on the sides of the plates directed toward the webs, in order to reduce the contacting surfaces between the plates and the webs. Nozzles 42 and 43 open into the slots 35 and 36, respectively, of the plate 34 and a nozzle 44 opens into the transverse slot 37. A nozzle 45 confronts the perforation 39 of the plate 33.

The mode of operation of the device described with reference to FIG. 4 is substantially as follows. The two webs 30 and 31 are moved down between the plates 33 and 34 which at that time are separated from the webs. After the lower edges of the webs have passed beyond the transverse slots 37 in the plates these plates are moved toward the webs to force them tightly together. Then the nozzles 42 and 43 are moved along the slots 35 and 36 while discharging hot air, and the longitudinal edges of the webs are welded together under the action of the hot air jets which pass from the nozzles through the fabric webs and through the slots in the opposite plate. At the same time or thereupon the nozzle 44 is moved from one end to the other end of the transverse slot 37. As a result, the webs are cut and the lowermost parts thereof are separated and form a bag. Concurrently with the cutting operation the transverse edges of the webs are welded together so as to seal the upper edge 45 of the bag. The transverse lower edges 46 of the webs will also be tightly joined as they are burnt by the air jet from the nozzle 44. A corresponding joint is indicated at the lower edge 47 of the separated bag.

If the bag is to be filled for instance with tea leaves suitable portions thereof are fed through the tubes 32 before the webs are cut by means of the nozzle 44. If it is desired to divide the bag into compartments hot air is passed from the nozzle 45 through the perforation 39 resulting in a corresponding seam 49 of the bag. This seam is suitably made at the same time as the longitudinal edges of the webs are joined to each other by means of the air jets from the nozzles 42 and 43. After the bag has been severed at the lower parts of the webs the plates 33 and 34 are separated again from each other to permit the severed bag to drop, and the webs are advanced again through a distance corresponding to the length of the bag. The device is then ready to produce the next bag.

Instead of advancing the webs to be treated and joined intermittently as described above they may be advanced continuously at a certain suitable constant speed. In this case the plates may be replaced by rollers within which the air nozzles are provided. The bags may be severed after the longitudinal edges have been joined.

A gas or gas mixture other than air can be used and the terms air jet or air jets employed above do not involve a limitation of the invention to some special gas or gas mixture.

What is claimed is:

1. A method of bonding together a plurality of layers of fabric composed of woven thermoplastic threads, comprising superposing a plurality of said fabric layers so that they touch each other, passing hot gas through all said layers at a plurality of discontinuous spaced points in a line so as to fuse together the layers at said points, said line having some of said points therealong disposed a substantial distance from all edges of the fabric, and masking the fabric from the hot gas between said points so as to prevent the hot gas from destroying the thermoplastic threads between said points.

2. A method as claimed in claim 1, in which said fabric is composed of braided thermoplastic threads.

3. A method as claimed in claim 1, said threads having a thickness of about 20 to 30 deniers, the threads being spaced apart a distance at least as great as about three threads per millimeter.

References Cited

UNITED STATES PATENTS

| 2,398,398 | 4/1916 | Abbott | 156—497 |
| 2,465,254 | 3/1949 | Morel | 156—497 X |
| 2,481,602 | 9/1949 | Lindh. | |
| 2,592,463 | 4/1952 | Phillips. | |
| 2,760,250 | 8/1956 | Bernillon | 156—88 X |
| 2,849,347 | 8/1958 | Uziel. | |
| 3,012,918 | 12/1961 | Schaar | 156—82 |
| 3,084,489 | 4/1963 | Seefluth | 156—497 X |

FOREIGN PATENTS

| 573,409 | 2/1958 | Italy. |

EARL M. BERGERT, *Primary Examiner.*

P. DIER, *Assistant Examiner.*